United States Patent [19]

Kondo

[11] 4,024,552
[45] May 17, 1977

[54] ELECTROMAGNETICALLY DRIVEN OPTICAL BLADE

[75] Inventor: Toshihiro Kondo, Chofu, Japan

[73] Assignees: Toshihiro Kondo, Chofu; Fuji Photo Film Co., Ltd., Minami-ashigara, both of Japan

[22] Filed: Mar. 16, 1976

[21] Appl. No.: 667,418

[30] Foreign Application Priority Data

Mar. 28, 1975  Japan .............................. 50-37511

[52] U.S. Cl. .................................. 354/234; 310/13
[51] Int. Cl.$^2$ ..................... G03B 9/08; H02K 41/02
[58] Field of Search ................. 354/234, 241, 226; 350/269, 270, 272; 335/299; 310/12, 13

[56] References Cited

UNITED STATES PATENTS

| | | | |
|---|---|---|---|
| 3,092,002 | 6/1963 | Frenk .................................. | 354/234 |
| 3,191,516 | 6/1965 | Corcoran ........................ | 350/269 X |
| 3,353,131 | 11/1967 | Stubles et al. .................... | 310/13 X |
| 3,685,423 | 8/1972 | Dahlgren ........................... | 354/241 |

*Primary Examiner*—L. T. Hix
*Assistant Examiner*—Michael L. Gellner

[57] ABSTRACT

A thin electromagnetic coil sheet is sealed in a plastic blade. The coil sheet is composed of a plastic film substrate and a photo-etched coil deposited thereon. The coil sheet is sealed in the plastic blade at the middle of the thickness thereof.

7 Claims, 7 Drawing Figures

ELECTROMAGNETICALLY DRIVEN OPTICAL BLADE

BACKGROUND OF THE INVENTION

1. Field of the Invention

This invention relates to an optical blade such as a shutter blade or a diaphragm blade for intercepting light rays in optical instruments such as photographic cameras, motion picture cameras, holographic cameras like, and more particularly to an optical blade which is driven to close or open a light passage in optical instruments by an electromagnetic force.

2. Description of the Prior Art

It has been desired to reduce the number of parts of a camera to reduce the weight and size thereof. By simplifying the structure of the camera, it is also possible to simplify the operation and lower the manufacturing cost thereof. From the viewpoint of simplification, it is undesirable to drive the various mechanisms in the camera only by mechanical driving means. Therefore, as a means for controlling the shutter mechanism and the diaphragm mechanism it has been proposed and put into practice an electric control means employing an exposure control circuit.

Even in these electrically controlled cameras, however, the control mechanisms are driven by a mechanical force as of a spring. For instance, a spring force is charged by an operation to set a shutter mechanism and locked by a lock member, and then, the lock member is released by means of a solenoid or the like which is controlled by an electric circuit. The shutter mechanism is then driven by the force of the charged spring. These cameras employing a spring force to drive the shutter mechanism or the like require a complicated mechanical driving means. Therefore, the structure and operation of these cameras are still complicated and accordingly the manufacturing cost is still high.

In view of the defects inherent in these cameras, it has been proposed to drive the shutter mechanism or diaghragm mechanism by an electromagnetic force by use of a combination of a permanent magnet and a coil. However, since the driving force of the coil depends upon the number of turns of the windings and the amount of electric current flowing therethrough, the number of turns must be increased to obtain a large driving force with cells which, being small enough to load in the limited space within the camera body, are necessarily of low power, an increase in the number of turns of the coil windings results in an increase in the size of the coil, which is undesirable from the viewpoint of manufacture. Therefore, it is desired that the optical blade electromagnetically driven should have the minimum weight possible. Further, in a case where the shutter blade is to be driven at a great speed, the inertia of the blade is desired to be as small as possible. From this point of view also, the weight of the blade is desired to be as small as possible.

In addition, the conventional optical blade is usually made of metal sheet having the thickness of about 0.04mm and bearing a black mat coating to prevent surface reflection. Such a metal blade has a defect in that the surface coating is apt to be scratched by the sharp edge of an adjacent blade particularly when the blade is used in a diaphragm comprising a number of diaphragm blades. The coating material scratched off falls on the surface of lenses in the camera and degrades the quality of the image. Further, the work of coating the surface of the blade with the black mat material is quite troublesome since the thickness of the blade is as small as several tens of microns. Besides, the metal blade has a large weight since the specific gravity of the metal used for the blade is as large as 7.0. Therefore, the metal blade is not suitable for electromagnetic driving.

SUMMARY OF THE INVENTION

The present invention is directed to an optical blade member such as a shutter blade or a diaphragm blade which is electromagnetically driven by an electromagnetic force.

It is an object of the present invention to provide an electromagnetically driven optical blade of small weight to be easily driven by an electromagnetic force.

It is another object of the present invention to provide an electomagnetically driven optical blade which can be manufactured at a low cost.

It is still another object of the present invention to provide an electromagnetically driven optical blade which is provided with an electromagnetic coil to be driven by a fixedly provided permanent magnet when energized or deenergized.

It is a further object of the present invention to provide a plastic light intercepting blade such as a shutter blade or a diaphragm blade for cameras which is electromagnetically driven.

The optical blade in accordance with the present invention is characterized in that a thin electromagnetic coil sheet is provided in a plastic blade containing black pigments for making the blade impervious to light. The thin electromagnetic coil sheet is sealed in a light impervious plastic blade so that the coil sheet is located at the middle of the thickness of the plastic blade. Therefore, the optical blade in accordance with the present invention does not have sharp edges, and accordingly, there is no fear of scratching the surface of other bladea.

DESCRIPTION OF THE PREFERRED EMBODIMENTS

Figure 1:
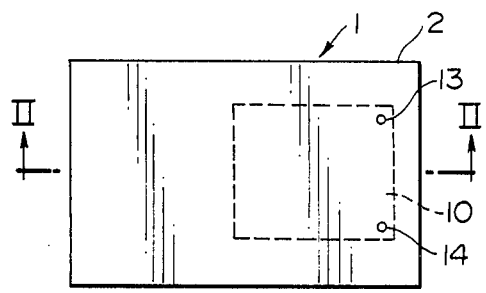
FIG. 1 is a plan view of an optical blade in accordance with an embodiment of the present invention.
Figure 2:
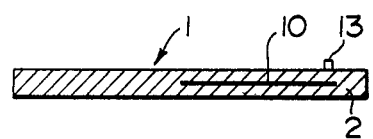
FIG. 2 is a sectional view of the optical blade as shown in Figure 1 taken along the line II—II thereof.
Figure 3:
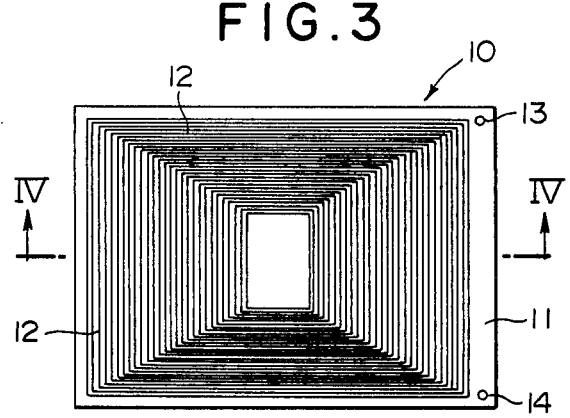
FIG. 3 is a plan view of an electromagnetic coil sheet sealed in the optical blade as shown in FIGS. 1 and 2.
Figure 4:
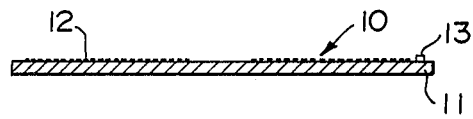
FIG. 4 is a sectional view of the electromagnetic coil sheet as shown in FIG. 3 taken along the line IV—IV thereof.

An embodiment of the optical blade in accordance with the present invention is illustrated in FIGS. 1 and 2. The optical blade 1 has a rectangular shape and is used as a leading or trailing shutter blade of a focal plane shutter. The optical blade 1 has an electromagnetic coil sheet 10 sealed in the middle of the thickness of a plastic sheet 2. The plastic sheet 2 has a thickness of 500 to 200 microns.

The electromagnetic coil sheet 10 comprises a plastic film substrate 11 and a photo-etched coil 12 deposited thereon. The photo-etched coil 12 is formed by applying a thin layer of aluminium, copper, silver or the like in the thickness of 5 to 10 microns on the plastic film substrate 11, and then removing a part of the layer to leave the layer in the form of coil by the technique of photo-etching. The coil 12 has at the both ends thereof terminals 13 and 14 projecting on the substrate 11. This kind of electromagnetic coil sheet is well known in the art, and accordingly, the structural details thereof are omitted here.

The plastic sheet 2 is made of thermoplastic resins such as polyacetal, polycarbonate, polyester etc. containing black pigments such as carbon black, or thermosetting resins such as resol type phenolic resins of xylen and phenol, diallyl phthalate resins, epoxy resins, unsaturated polyester resins etc. containing black pigments such as carbon black. Further, since the blade is required to be somewhat rigid, fabric reinforcement material such as carbon fiber or hard rubber is incorporated in the plastic material as required.

In preparing the optical blade as described above, a polymer containing black pigments and fabric reinforcement therein can be molded together with an electromagnetic coil sheet located in the middle of the polymer by injection molding, or the coil sheet can be laminated together with two plastic sheets interposing the coil sheet therebetween. When the optical blade is used as a shutter blade or a diaphragm blade, the surface of the blade should preferably processed to have a rough surface to prevent surface reflection.

Figure 5:
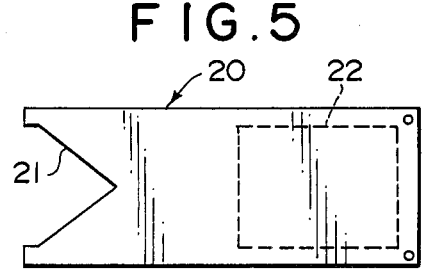
FIG. 5 is a plan view of an optical blade in accordance with another embodiment of the present invention.

An example of a shutter in which the blade in accordance with the present invention is employed will now be described in detail with reference to FIGS. 5 to 7. As shown in FIG. 5, a shutter blade 20 in accordance with this embodiment has a V-shaped cut-away portion 21 at one end thereof and is provided with an electromagnetic coil sheet 22 sealed therein near the other end portion thereof. The electromagnetic coil sheet 22 is magnetizable in the longitudinal direction. The structural details of the shutter blade 20 are the same as those shown in the aforesaid embodiment shown in FIGS. 1 to 4.

Figure 6:
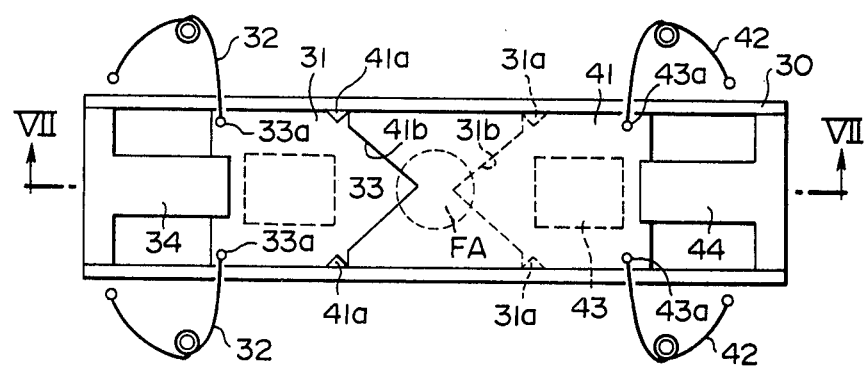
FIG. 6 is a plan view showing an example of a shutter for a camera employing the optical blade as shown in FIG. 5.
Figure 7:
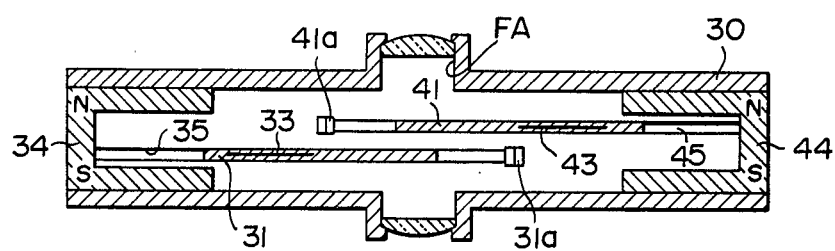
FIG. 7 is a longitudinal sectional view of the shutter as shown in FIG. 6 taken along the line VII—VII thereof.

FIGS. 6 and 7 show and example of a guillotine shutter which employs the shutter blade in FIG. 5. Two shutter blades 31 and 41 are slidably mounted in a shutter frame 30 to be guided along two guide grooves 35 and 45, respectively. The two shutter blades 31 and 41 are held in abutment with stoppers 31a and 41a by means of spring means (not shown) when the shutter is closed, as shown in FIG. 6. The first shutter blade 31 has sealed therein an electromagnetic coil 33 and the second shutter blade 41 has sealed therein an electromagnetic coil 43. The electromagnetic coils 33 and 43 are connected with lead wires 32 and 42 at their terminals 33a and 43a, respectively. A first permanent magnet 34 is stationarily provided beside the first shutter blade 31 and a second permanent magnet 44 is stationarily provided beside the second shutter blade 41. When the first coil 33 is energized, the first shutter blade 31 is moved to the left overcoming the force of the spring means by an electromagnetic force produced between the first coil 33 and the permanent magnet 34 carried in the first shutter blade 31. Similarly, when the second coil 43 is energized, the second shutter blade 41 is moved to the right. Thus, by energizing the coils 33 and 43, the shutter blades 31 and 41 are slid in the direction to open a light passage to expose a film in the camera. After the shutter is opened, the shutter blades 31 and 41 are closed by the force of the spring means upon deenergization of the coils 33 and 43. The shutter speed is controlled by controlling the time during which the coils 33 and 43 are energized. In order to obtain an extremely high shutter speed, the coils 33 and 43 are energized in the reverse direction when the shutter blades 31 and 41 are to be closed. In the above embodiment, it is possible to control the length of stroke of the shutter blades by use of a step cam or the like located in the way of the movement of the shutter blades, whereby the size of an aperture formed by the cut-away portions 31b and 41b of the shutter blades 31 and 41 is controlled.

I claim:
1. An optical blade which is electromagnetically driven comprising an opaque plastic sheet member and an electromagnetic coil sheet sealed therein, said coil sheet extending in parallel to the plastic sheet member.

2. An optical blade as defined in claim 1 wherein said electromagnetic coil sheet is located at the middle of the thickness of said plastic sheet member.

3. An optical blade as defined in claim 1 wherein said electromagnetic coil comprises a plastic film substrate and a photo-etched coil deposited thereon.

4. An optical blade as defined in claim 1 wherein said plastic sheet member comprises a plastic material and black pigment mixed therewith.

5. An optical blade as defined in claim 4 wherein said plastic material is thermoplastic resin.

6. An optical blade as defined in claim 4 wherein said plastic material is thermosetting resin.

7. An optical blade as defined in claim 4 wherein said black pigment is carbon black.

* * * * *